(12) United States Patent
Mattila et al.

(10) Patent No.: US 7,159,186 B2
(45) Date of Patent: Jan. 2, 2007

(54) USER INTERFACE FOR TRANSFERRING DATA WITH A COMMUNICATIONS TERMINAL

(75) Inventors: Jouka Mattila, Tampere (FI); Riku Suomela, Tampere (FI); Eero Rasanen, Tampere (FI)

(73) Assignee: Nokia Corporation, Espoo (FI)

( * ) Notice: Subject to any disclaimer, the term of this patent is extended or adjusted under 35 U.S.C. 154(b) by 17 days.

(21) Appl. No.: 10/159,410

(22) Filed: May 31, 2002

(65) Prior Publication Data

US 2003/0222913 A1 Dec. 4, 2003

(51) Int. Cl.
*G06F 3/00* (2006.01)

(52) U.S. Cl. .................. 715/769; 715/733; 715/764; 715/737; 715/738; 715/724; 715/749

(58) Field of Classification Search ................ 345/853, 345/733, 764, 744, 737, 738, 749, 769, 724
See application file for complete search history.

(56) References Cited

U.S. PATENT DOCUMENTS

| | | | |
|---|---|---|---|
| 6,247,130 B1 * | 6/2001 | Fritsch | 713/171 |
| 6,248,946 B1 * | 6/2001 | Dwek | 84/609 |
| 6,295,551 B1 * | 9/2001 | Roberts et al. | 709/205 |
| 6,538,673 B1 * | 3/2003 | Maslov | 345/853 |
| 6,542,814 B1 * | 4/2003 | Polidi et al. | 701/208 |
| 6,557,009 B1 * | 4/2003 | Singer et al. | 707/104.1 |
| 6,609,105 B1 * | 8/2003 | Van Zoest et al. | 705/14 |
| 6,654,378 B1 * | 11/2003 | Mahany et al. | 370/401 |
| 2002/0126153 A1 | 9/2002 | Withers et al. | |
| 2003/0093467 A1 * | 5/2003 | Anderson | 709/203 |

* cited by examiner

*Primary Examiner*—Ba Huynh
*Assistant Examiner*—Mylinh Tran
(74) *Attorney, Agent, or Firm*—Banner & Witcoff, Ltd.

(57) ABSTRACT

An aspect of the present invention provides methods and apparatus for supporting a user interface of a terminal. The user interface enables the user to manipulate display objects on a display of the user interface in order to download software objects of other users, execute software objects of the user or of other users, and share software objects with other users. In an embodiment of the invention, the display is partitioned into three areas comprising a user's data area, an applications area, and another user's data area. The user can drag a display object between the user's data area and the other user's data area in order to download or publish a corresponding software object. Also, the user can drag a display object from either the user's data area or the other user's data area to the application area in order to execute or view the corresponding software object.

46 Claims, 6 Drawing Sheets

USER INTERFACE FOR TRANSFERRING DATA WITH A COMMUNICATIONS TERMINAL

FIELD OF THE INVENTION

The present invention relates to a communications terminal that enables a user to transfer software objects between other user's data sources and the user's terminal through a user interface.

BACKGROUND OF THE INVENTION

With the explosion the Internet services and wireless communications services, a user has access to an increasing amount of software objects that is dispersed across an increasing number of data sources. "Software objects" can assume numerous forms such as computer programs, text files, audio files, and video files, and multimedia files. Data sources can correspond to different entities, including personal computers, data servers, wireless communications devices, and so forth. With the current art, a user typically locates the data source and downloads the software object into the user's data memory so that the software object can be processed at a subsequent time. With the Internet, the user typically locates the data using a search engine, accesses the identified data source, connects to the data source using the appropriate universal resource locator (URL), and accesses the desired software object. Alternatively, with a computer network, e.g. the Internet or a UNIX-based network, the user can utilize a file transfer protocol (FTP) to access software objects (e.g. files). The user typically indicates the host name of a computer, user name, and password. When this information is successfully entered, the user is remotely connected to the host computer. At that point of time, the user can download software objects from the host computer and upload software objects to the host computer.

The user typically must separately query and access each computer (data source) in order to obtain a software object. Needless to say, the number of accessible computers is increasing at a substantial rate. Moreover, data sources are assuming forms other than the traditional "computer." As an example, a wireless communications terminal is expanding its functionality beyond the traditional "mobile telephone" to include the functionality of a gaming device, a "computer," and a multi-media playing device. Consequently, the user has a greater need to access and organize software objects in order to support the increased functionality. With the associated mobility of a wireless terminal, a collection of data sources can dynamically vary with the movement of the wireless terminal. The complexity of separately connecting and accessing a data source is compounded by a variation of the universe of data sources as a wireless terminal changes location. Moreover, terminals (e.g. wireless terminals and personal computers) are becoming smaller in size, thus decreasing the available space that is available for a display and a user input device. There is a need for an approach that provides a consolidated display of software objects, thus facilitating downloading software objects, executing software objects by the user's terminal, and sharing software objects with other users.

SUMMARY OF THE INVENTION

An aspect of the present invention provides methods and apparatus for supporting a user interface of a terminal. The user interface enables the user to manipulate display objects that are displayed on a user interface's display in order to download software objects of other users, execute software objects of the user or of other users, and share software objects with other users. Software objects may be stored at a user's terminal, a user's data storage device, another user's terminal, or another user's data storage device.

In an embodiment of the invention, the display is partitioned into three areas comprising a users data area, an applications area, and another user's data area to facilitate the user in manipulating display objects (e.g. graphical icons and a display region) through the user interface. The user can drag an icon from the user's data area or from the other user's data area into the applications area in order to execute or view a corresponding software object (e.g. a data file or a program file). The user can drag an icon from the other user's data area to the user's data area in order to download a corresponding software object into the user's terminal. Also, the user can drag an icon from the user's data area to the other user's data area in order to "publish" the availability of the associated software object to other users.

In a variation of the embodiment, the present invention supports a wireless terminal that can change geographical locations, causing available software objects of other users to dynamically change. In such a case, the collection of icons in the other user's data area changes in accordance with the availability of the corresponding software objects. In another variation of the embodiment, the present invention supports a wireline terminal that has connectivity to the Internet. In another variation of the embodiment, the terminal can upload a software object to another user's terminal by dragging the associated icon from the user's data area to the other user's data area.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
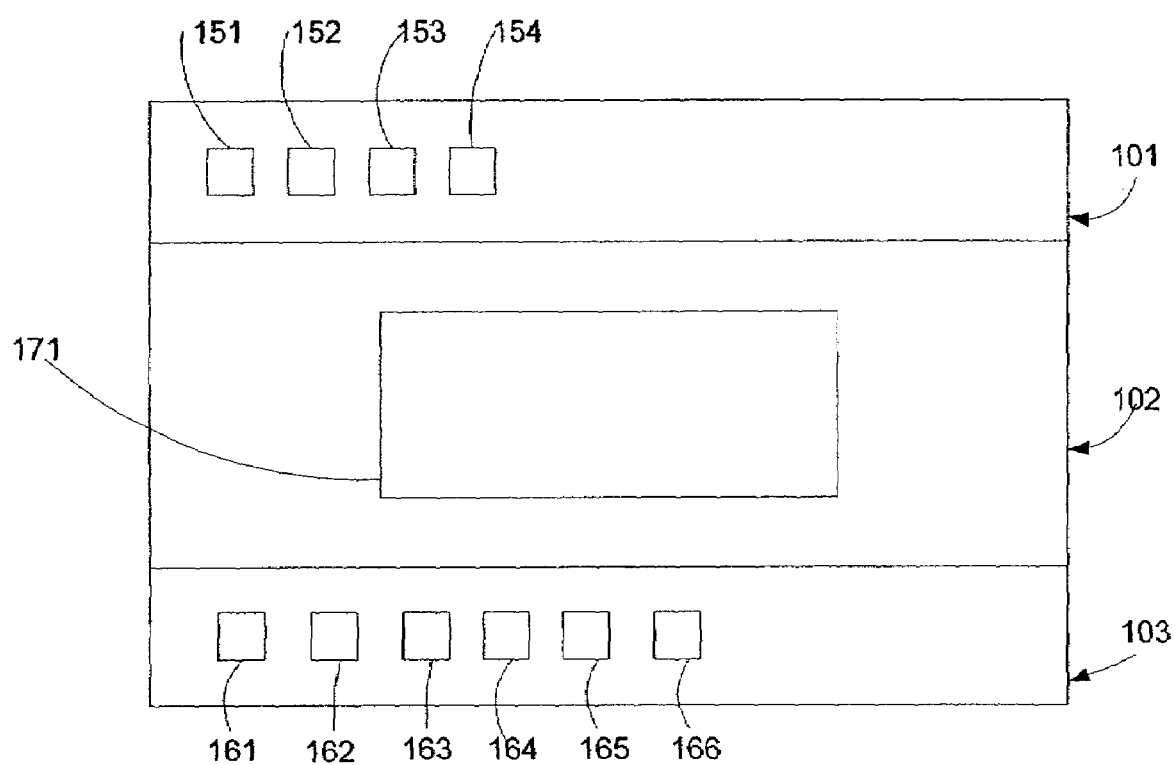
FIG. 1 shows a display illustrating a user's data area, an application area, and another user's data area in accordance with an embodiment of the invention.

FIG. 1 shows a display 100 illustrating a user's data area 103, an application area 102, and another user's data area 101 in accordance with an embodiment of the invention. Graphical icons 161, 162, 163, 164, 165, and 166 correspond to software objects (e.g. a data file, a data directory that may contain a plurality of data files, a program file, a data structure, and a data object) in user's data area 103. Icons 161–166 correspond to software objects that are stored in a user's terminal (e.g. a wireless terminal 603 that will be discussed in the context of FIG. 6) or some other data storage device (e.g. a user's data storage device 305 as will be discussed in the context of FIG. 3). The software objects in user's data area 103 can be public in that the software objects are accessible by other users or can be private in that the software objects are not accessible by other users. In the embodiment, icons that correspond to public software objects can be distinguished from icons that correspond to private software objects (e.g. coloring the icons, sizing the icon, or associating an additional icon with the icon) in order to warn the user about inadvertently allowing other users to access such software objects. However, the embodiment does not preclude the user from allowing other users to access the user's private software objects.

Figure 3:
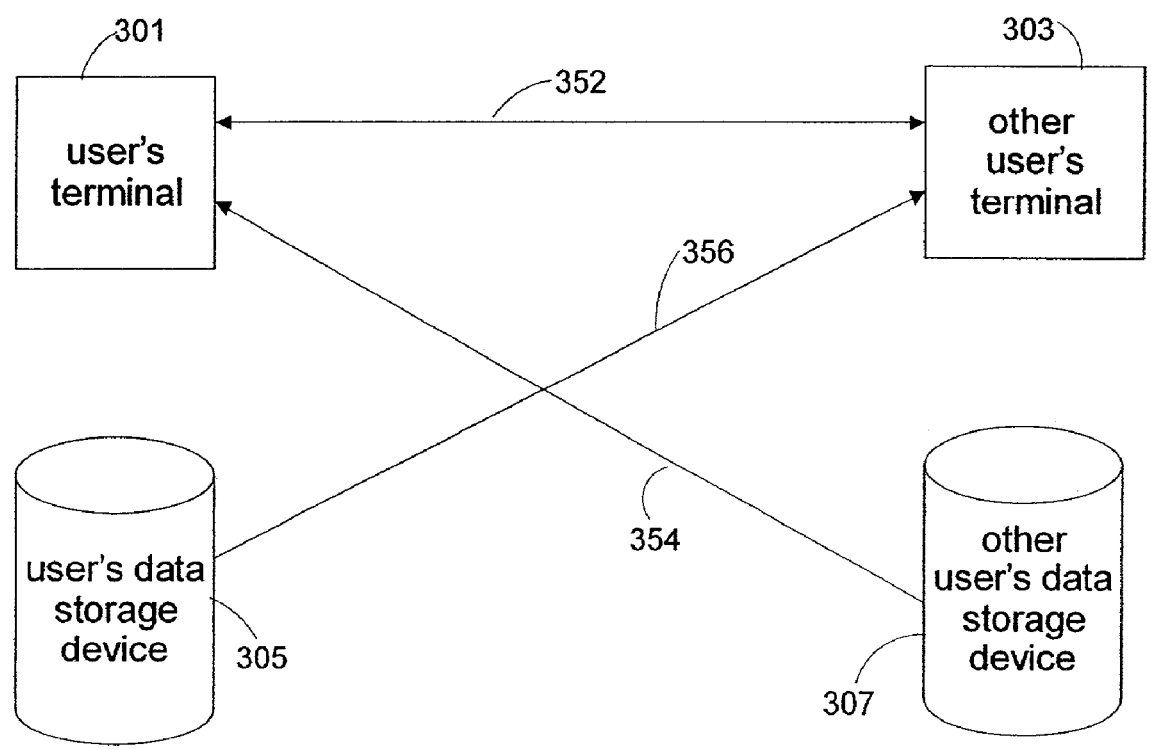
FIG. 3 shows a configuration for exchanging software objects in accordance with an embodiment of the invention.

Graphical icons 151, 152, 153, and 154 represent software objects in other user's data area 101. (In the embodiment, different software objects that are shown in other user's data area 101 may be from different sources and may have different owners.) The software objects represented in other user's data area 101 are public so that the user can access the data files. Software objects that are private for other users are not represented by icons in area 101 since the associated software objects are not accessible by the user. The user can be connected to another device (that is associated with another user) by the user's terminal communicating with the other device utilizing a communications protocol, including Bluetooth (a wireless limited-distance transmission technology operating in the 2.45 GHz unlicensed radio band), a local area network, e.g. a wireless local area network including Institute of Electrical and Electronics Engineers Wireless Local Area Networks Standards (IEEE 802.11), a peer-to-peer connection such as a telephone call, or an Internet connection. Software objects that are represented in other user's data area 101 can be stored in another user's terminal 303 or in another user's data storage device 307 as shown in FIG. 3.

Figure 6:
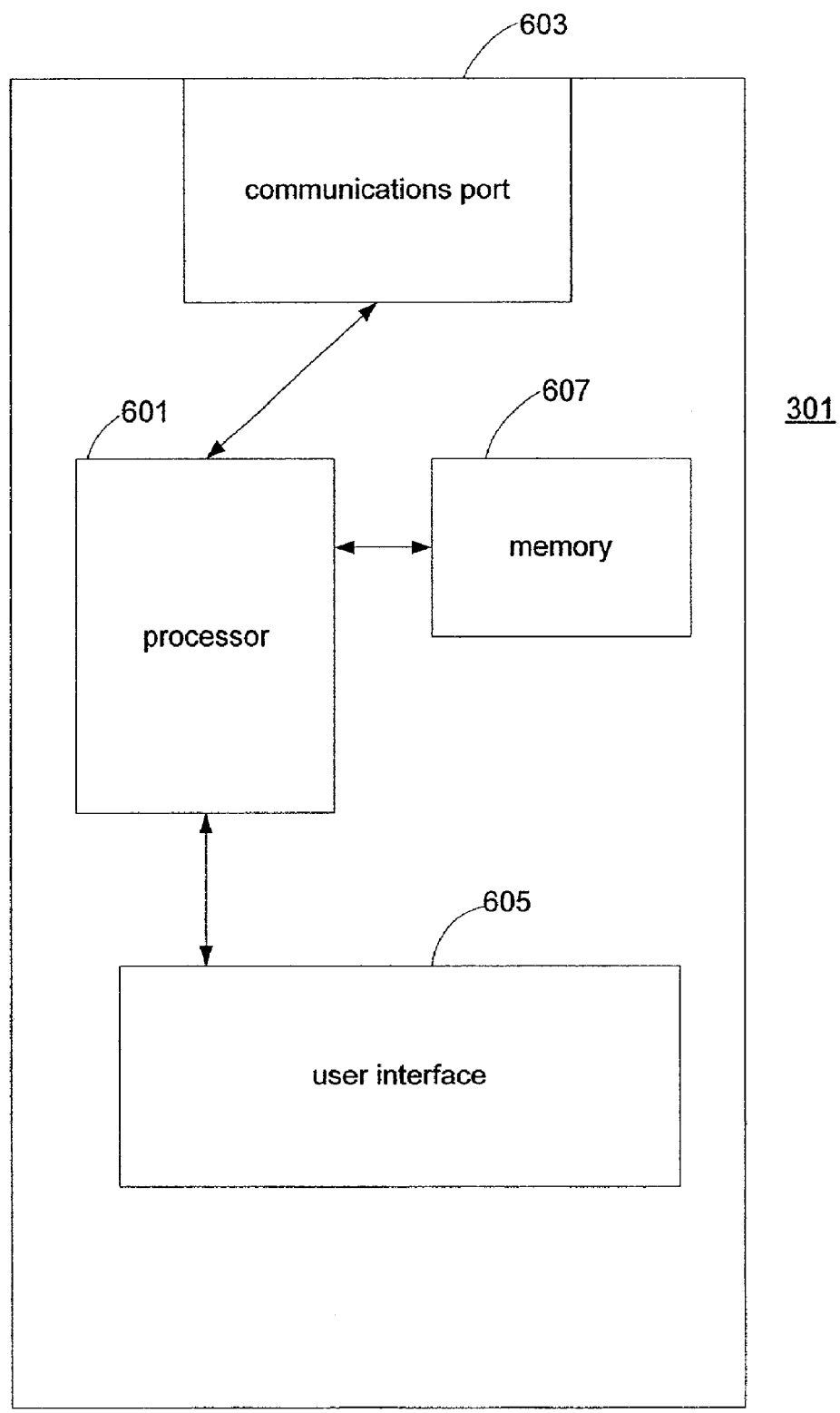
FIG. 6 shows an architecture for a terminal supporting data transfer services.

Icons 161–166 and icons 151–154 may be associated with properties of the associated software object such as: a name of the software object, a location (e.g. URL) where the software object can be accessed by the user, an owner of the software object, and a bitmap. The name and the location are utilized to draw the icon on a user interface 605 (as shown in FIG. 6). For example, an icon template may be associated with a particular name of a game. The owner of the associated software object defines where the icon is drawn on user interface 605 (e.g. user's data area 103 or other user's data area 101). If the user desires to access the software object, the location (URL) specifies where the software object can be accessed.

Figure 2:
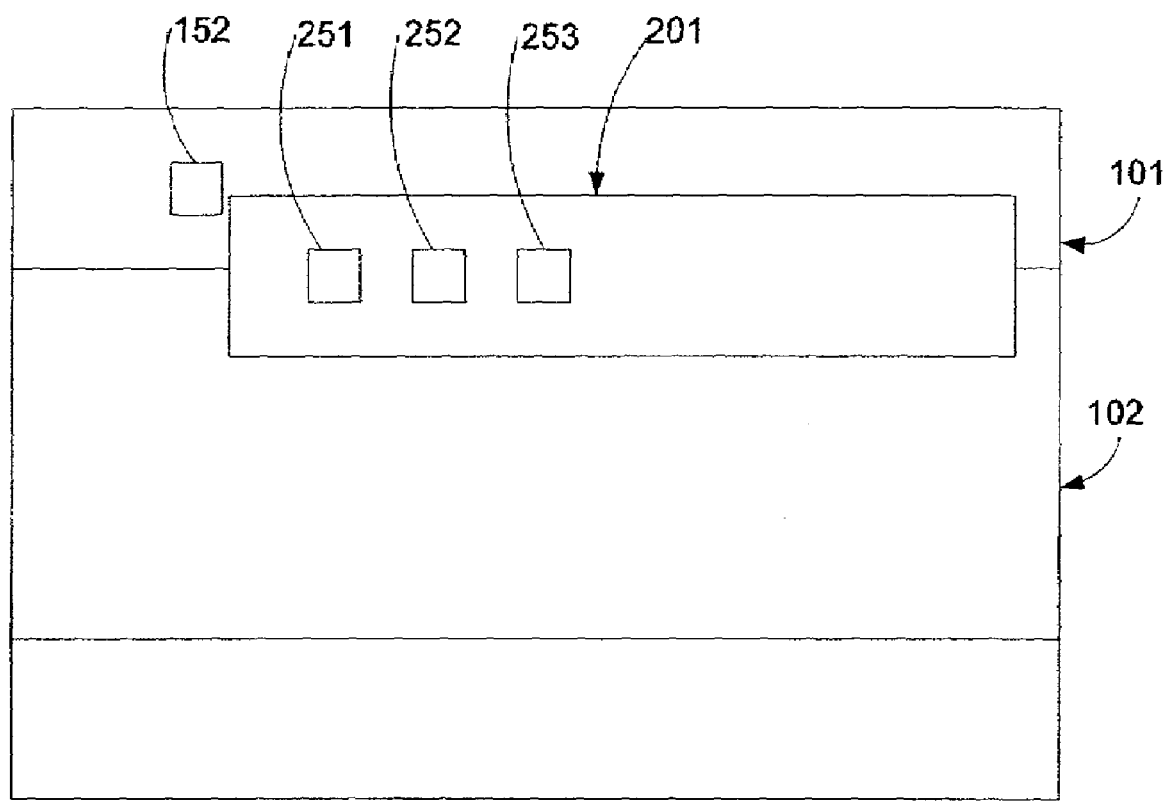
FIG. 2 shows a display in which an icon is expanded to provide software objects that are categorized by the icon in accordance with an embodiment of the invention.

When an icon (e.g. icon 151 or icon 162) is "positioned" in a display region 171 of application area 102 (as will be discussed in more detail in the context of FIG. 5), the corresponding software object is launched (e.g. a computer program is executed) or data content is viewed (e.g. a multi-media file is viewed). For either case, the software object is "opened." The software object is "closed" in order to terminate the execution or viewing of the software object. Icons 151–154, icons 161–166, and display region 171 are referred as "display objects." Also, as shown in FIG. 2, a display object may represent a data directory. In such a case, the associated data directory may be opened by dragging the display object into area 102 or alternatively by a user pressing (not having to wait for the user to release a control button) on the icon.

While FIG. 1 shows user's data area 103 at the bottom, other user's data area 101 at the top, and application area 102 in the middle and being the largest area, other embodiments can utilize different partitions of display 100 to form areas 101, 102, and 103.

FIG. 2 shows display 100 in which icon 152 is expanded to provide software objects 251, 252, and 253 that are categorized (e.g. by location-based associated criteria) by the icon in accordance with an embodiment of the invention. Icon 152 represents a software object that is typically termed a data directory and contains a plurality of data files. Icon 152 can be associated with at least one category. A category is used to create structural information, in which all the software objects that are associated with icon 152 have a common trait, e.g. short message service (SMS) messages, e-mail messages, a category of advertiser, or location-based information. Location-based information (e.g. the distance of a data source from the user's terminal) can be useful in an environment in which user is mobile. For example, the user is able to distinguish advertisements of restaurants that are within five miles of the user.

In the embodiment, when the user "clicks on" icon 152 using a mouse or "pressing on" icon 152 with a stylus, an area 201 is opened in order to display associated icons 251, 252, and 253. The user can position any of the icons (251–253) to area 102 or area 103. Alternatively, the user can drag icon 152 into applications area 102.

FIG. 3 shows a configuration for exchanging software objects in accordance with an embodiment of the invention. In the embodiment, a user's terminal 301 can connect to other user's terminal 303 or to other user's data storage device 307 in order to exchange software objects that are publicly available. In the embodiment, if user's terminal 301 is a wireless terminal, terminal 301 can connect to other user's terminal 303 through a wireless channel 352 or to other user's data storage device 307 through a wireless channel 354 using a wireless communications protocol, e.g. Bluetooth or IEEE 811.01. (With the embodiment, a connection to a storage device, e.g. other user's data storage device 307, is predicated upon a connection to an associated terminal, e.g. other user's terminal 303. Also, the embodiment may support data transfer between user's terminal 301 and user's data storage device 305, between user's data storage device 305 and other user's data storage device 307, and between other user's terminal 303 and other user's data storage device 307.) Other user's terminal 303 can connect to user's terminal 301 through wireless channel 352 or to user's data storage device 305 through a wireless channel 356. In the embodiment, user's data storage device 305 and other user's data storage device 307 may be anywhere, e.g. the Internet. Thus, a connection to storage device 305 or 307 may be different than a connection between terminals 301 and 303. Moreover, other embodiments of the invention can support terminal 301 in a wireline or a cable configuration. Before exchanging software objects, terminal 301 connects to other user's terminal 303 or other user's data storage device 307 in order to query about publicly available software objects. The devices exchange information about software objects, e.g. a URL that points to the device storing the software object and the name of the software object. Memory in the user's terminal and the user's data storage device are collectively referred as the user's data storage capacity. Similarly, memory in the other user's terminal and the other user's data storage device are collectively referred as the other user's data storage capacity.

Figure 4:
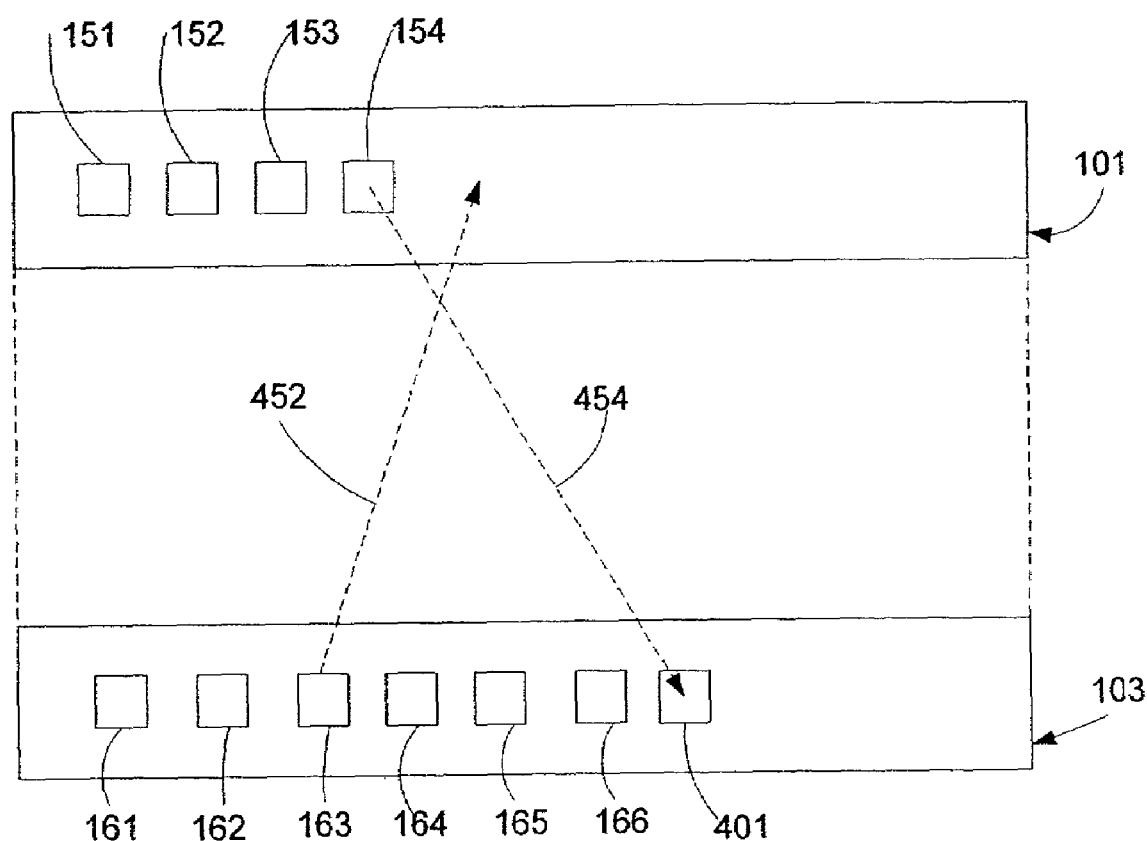
FIG. 4 shows operations for exchanging a software object between a user's data area and another user's data area.

FIG. 4 shows operations for exchanging a software object between user's data area 103 and other user's data area 101. In FIG. 4, the user positions icon 163 into area 101 by executing an operation 452, thus causing the software object that is associated with icon 163 to be "published." (Publishing data may signify that data is copied to a public portion, e.g. a public folder, of the user's network data area. The data is subsequently visible to other users.) Publishing the software object notifies other users that the software is available for accessing by other users. When a software object is published, other users will have knowledge of the software object when information is exchanged as discussed in FIG. 3. In the embodiment, the user utilizes a stylus (free cursor) with a touch screen to execute the operations and utilizes a small screen (half VGA). However, other embodiments can use other types of input devices (e.g. buttons or a mouse) and other types of displays.

In a variation of the embodiment, the user can upload a software object from user's terminal 301 to other user's terminal 303. The user drags an icon (e.g. icon 162) in user's data area 103 to an icon (e.g. icon 152) that is associated with properties of another user (e.g. "notes to Joe"). The operation inserts a software object that is associated with icon 162 into a data directory that is associated with icon 152.

In FIG. 4, the user can copy a software object that is associated with icon 154 (which may be stored in other user's terminal 303 by dragging icon 154 to user's data area 103 by a dragging operation 454, thus forming an icon 401 in which an associated software object is copied into the user's data storage device. Both operations 452 and 454 are represented in Table 1 (drag operations), in which the row represents the initial location of an icon and the column represents the completed location of the stylus. Each operation is translated into an instruction by user interface 605 and presented to a processor 601 (as shown in FIG. 6) for further processing.

TABLE 1

DRAG OPERATIONS

| | user's data area | application area | other user's data area |
|---|---|---|---|
| user's data area | — | launch data | publish data |
| application area | download data | — | publish data |
| other user's data area | download data | launch data | — |

Figure 5:
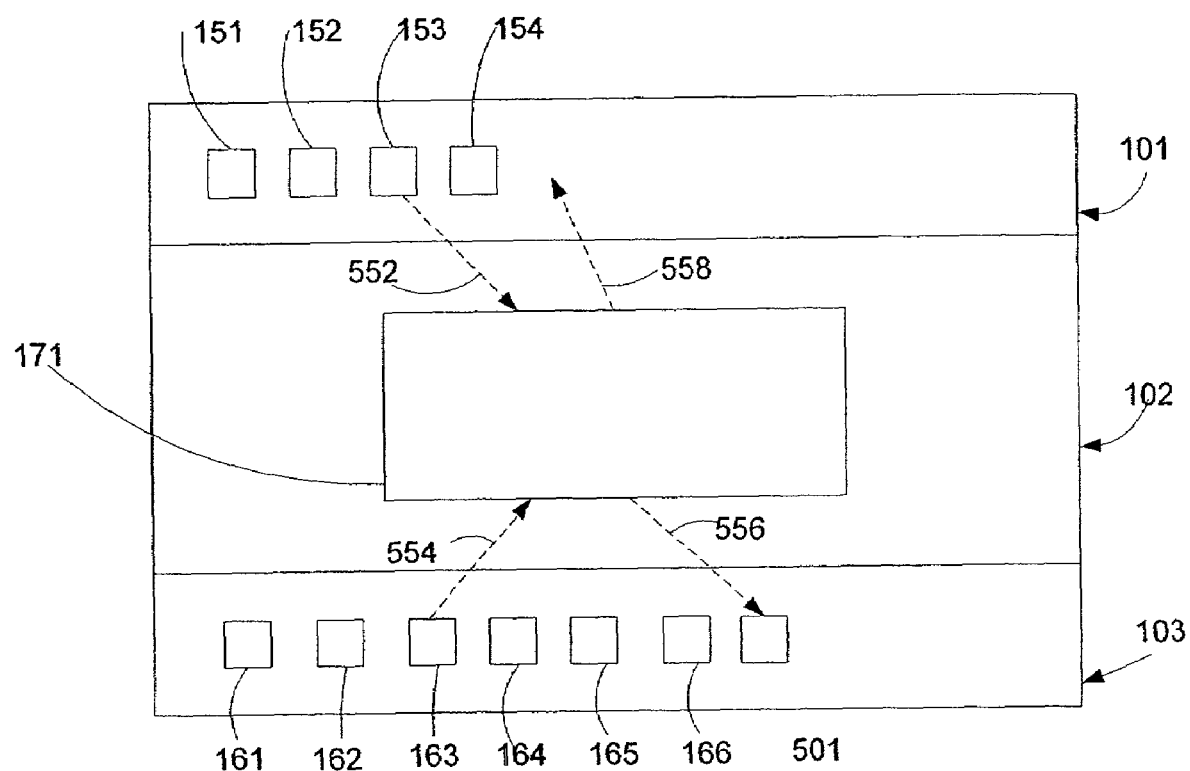
FIG. 5 shows operations for exchanging a software object between a user's data area and an application area and between another user's data area and the application area.

FIG. 5 shows operations for exchanging a software object between user's data area 103 and application area 102 and between other user's data area 101 and application area 102. If the user wishes to launch or view a software object associated with icon 153, the user positions icon 153 (in other user's area 103) to area 102 by executing an operation 552 with the stylus. Consequently, the software object is opened in display region 171 in order for the user to view the software object or execute the software object. The user can then position display region 171 to user's area 103 corresponding to an operation 556 in order to download the software object into user's terminal 301.

In a variation of the embodiment of the invention, a display component of user interface 605 displays a percentage of the software object that has been downloaded as the software object is being download into the user's data storage device. The percentage can be displayed as a number or a graphical representation in a region of the display component.

Also, the user can launch the software object associated with icon 163 into application area 102 by executing an operation 554, thus opening display region 171. The user can subsequently execute an operation 558 in order to publish the associated software object. The operations and the corresponding actions are shown in Table 1.

As shown in FIG. 5, the embodiment enables object 171 to be opened by executing operation 552 or operation 554. Display object 171 may be closed by moving display object 171 back to an area (e.g. area 101 or 103) where display object 171 came either by executing operation 558 or operation 556. With a variation of the embodiment, display object 171 may be closed by a menu key that may be located in proximity of display 100 (e.g. near the lower right corner of display 100.)

FIG. 6 shows an architecture for terminal 301 that supports data transfer services as shown in FIGS. 3, 4, and 5. Terminal 301 communicates with other terminals (e.g. 303) and data storage devices (e.g. 307) through a communications port 603. In the embodiment, communications port 603 supports the associated radio technology (e.g. IEEE 802.11). When exchanging software objects with another terminal or data storage device, software objects are transferred over channel 352 or channel 354 through communications port 603 and processor 601.

A second embodiment of the invention supports non-wireless technologies, including wireline services and cable services. The second embodiment utilizes the architecture shown in FIG. 6. In the second embodiment, communications port 603 supports the appropriate wireline technology (e.g. ITU-T V.90 standard for supporting 56 Kbps modems) or the appropriate cable technology Processor 601 receives user instructions (e.g. operation 454 in FIG. 4) through user interface 605 corresponding to the operations as shown in Table 1. User interface 605 may comprise a touch-sensitive display and a stylus in order that the user can input user commands through the touch-sensitive display. The touch-sensitive display also functions as an output device to display user's data area 103, application area 102, and other user's data area 101. Of course, user interface 605 may comprise another type of display and commands may be entered with a pointing device, such as a mouse, trackball, or pressure-sensitive input device. Processor 601 responds to a user instruction by downloading a software object into a memory 607, launches or enables the user to view a software object that is stored in memory 607 or in a memory of another terminal (e.g. 303) or data storage device (e.g. 307), and publishes a software object to other users. Also, processor 601 updates the icons as displayed on user interface 605 in response to the actions performed by processor 601.

In another variation of the embodiment of the invention, application area 102 of terminal 301 is updated to reflect an application area of other user's terminal 303 in order to support a collaborative session. Terminal 301 communicates with terminal 303 in order to obtain display information about the application area of terminal 303 through communication port 603 and processor 601. In the embodiment, terminals 301 and 303 utilize a fast data connection in order to establish communications.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A terminal for providing data transfer services, the terminal comprising:
 a user interface module comprising a display component and an input component;
 a communications port;
 a memory;
 a processor that receives and transmits a software object through the communications port, receives an instruction from a user through the input component, and displays a display object corresponding to the software object on the display component, wherein the display object is indicative of the physical distance of the software object from the terminal, the processor configured to perform the steps of:
  (a) receiving the instruction that indicates to position the display object from a first display area to a second display area, wherein the first display area and the second display area are displayed on the display component;
  (b) processing the software object in response to step (a); and
  (c) updating the display object on the display component.

2. The terminal of claim 1, wherein the display object that corresponds to the software object includes a display characteristic selected from the group consisting of a name of the software object, an icon, a source location of the software object, and an owner of the software object.

3. The terminal of claim 2, wherein the source location of the software object comprises a universal resource locator (URL).

4. The terminal of claim 1, wherein the software object is selected from the group consisting of a data file, a data directory, a program file, a data structure, and a data object.

5. The terminal of claim 1, wherein the first display area comprises another user's data area and the second display area comprises a user's data area, and wherein:
 step (b) comprises copying the software object from a second data storage capacity to a user's data storage capacity; and
 step (c) comprises copying the display object that is displayed on the other user's data area to a second display object that is displayed on the user's data area, wherein the display object and the second display object each comprise an icon.

6. The terminal of claim 5, wherein the display component comprises a region, the region displaying a percentage of the software object that has been downloaded into the user's data storage capacity.

7. The terminal of claim 5, wherein the user's data storage capacity comprises the memory.

8. The terminal of claim 5, wherein the user's data storage capacity comprises an external data storage device.

9. The terminal of claim 1, wherein the first display area comprises a user's data area and the second display area comprises another user's data area, and wherein step (b) comprises:
 (i) publishing the software object.

10. The terminal of claim 9, wherein step (i) comprises: copying the software object into a public folder.

11. The terminal of claim 10, wherein the display object is displayed on the user's data area, and wherein step (c) comprises:
 updating the display object to indicate that the software object has been published.

12. The terminal of claim 1, wherein the first display area comprises a user's data area and the second display area comprises another user's data area, and wherein step (b) comprises:
 uploading the software object to another user's data storage capacity.

13. The terminal of claim 1, wherein the first display area comprises a user's data area and the second display area comprises an application area, and wherein:
 step (b) comprises opening the software object from a user's data storage capacity; and
 step (c) comprises showing display information in the application area, wherein the display information is generated in response to the processor processing the software object.

14. The terminal of claim 1, wherein the software object comprises a data directory, and wherein:
 step (b) comprises opening the data directory from a data storage capacity; and
 step (c) comprises displaying a display region of the display component in order to show constituent software objects that are associated with the data directory.

15. The terminal of claim 1, wherein the first display area comprises an application area and the second display area comprises a user's data area, and wherein
 step (b) comprises storing the software object in a user's data storage capacity; and
 step (c) comprises displaying the display object on the user's data area, wherein the display object comprises an icon.

16. The terminal of claim 15, wherein step (b) further comprises
 closing the software object.

17. The terminal of claim 15, wherein the software object is executing in the memory.

18. The terminal of claim 1, wherein the first display area comprises another user's data area and the second display area comprises an application area, and wherein:
 step (b) comprises opening the software object from another user's data storage capacity, and
 step (c) comprises showing display information on the application area, wherein the display information is generated in response to the processor processing the software object.

19. The terminal of claim 1, wherein the first display area comprises an application area and the second display area comprises another user's data area, and wherein step (b) comprises:
 publishing the software object.

20. The terminal of claim 19, wherein step (b) further comprises
 closing the software object.

21. The terminal of claim 19, wherein step (c) comprises:
 updating the display object to indicate that the software object has been published.

22. The terminal of claim 1, wherein the processor is configured to perform the further step of:
  (d) connecting to a second terminal in order to exchange display information that is displayed in the application area of the terminal and a second application area of the second terminal.

23. The terminal of claim 1, wherein the first display area comprises another user's data area that corresponds to at least one other user.

24. The terminal of claim 1, wherein the second display area comprises another user's data area that corresponds to at least one other user.

25. A method for providing data transfer services through a user interface of a terminal, the method comprising the steps of:
  (a) receiving an instruction that indicates to position a display object from a first display area to a second display area, wherein a first display area and a second display area are displayed on a display component of the user interface and wherein a software object is associated with the display object, wherein the display object is indicative of the physical distance of the software object from the terminal;
  (b) processing the software object in response to step (a); wherein step (b) comprises the steps of:
    (i) if the software object is requested by the terminal, receiving the software object by the terminal from another terminal;
    (ii) if the software object is requested by the terminal, transmitting the software object by the terminal to the other terminal; and
  (c) updating the display object on a display component.

26. The method of claim 25, wherein the first display area comprises another user's data area and the second display area comprises a user's data area, and wherein:
  step (b) comprises copying the software object from a second data storage capacity to a user's data storage capacity; and
  step (c) comprises copying the display object that is displayed on the other user's data area to a second display object that is displayed on the user's data area, wherein the display object and the second display object each comprise an icon.

27. The method of claim 25, wherein the first display area comprises a user's data area and the second display area comprises another user's data area, and wherein step (b) comprises:
  publishing the software object.

28. The method of claim 27, wherein the display object is displayed on the user's data area, and wherein step (c) comprises:
  updating the display object to indicate that the software object has been published.

29. The method of claim 25, wherein the first display area comprises a user's data area and the second display area comprises an application area, and wherein:
  step (b) comprises opening the software object from a user's data storage capacity; and
  step (c) comprises showing display information on the application area, wherein the display information is generated in response by the processor processing the software object.

30. The method of claim 25, wherein the first display area comprises an application area and the second display area comprises a user's data area, and wherein
  step (b) comprises storing the software object in a user's data storage capacity; and
  step (c) comprises displaying the display object on the user's data area.

31. The method of claim 30, wherein step (b) further comprises:
  closing the software object.

32. The method of claim 25, wherein the first display area comprises another user's data area and the second display area comprises an application area, and wherein:
  step (b) comprises opening the software object from another user's data storage capacity; and
  step (c) comprises showing display information in the application area, wherein the display information is generated in response to the software object.

33. The method of claim 25, wherein the first display area comprises an application area and the second display area comprises another user's data area, and wherein step (b) comprises:
  publishing the software object.

34. The method of claim 33, wherein step (b) further comprises:
  closing the software object.

35. The method of claim 33, wherein step (c) comprises:
  updating the display object to indicate that the software object has been published, wherein the display object comprises an icon.

36. The terminal of claim 1, wherein the first display area comprises an application area and the second display area comprises another user's data area, and wherein step (b) comprises:
  (i) publishing the software object.

37. The terminal of claim 1, wherein (b) comprises:
  (i) accessing the software object from the memory.

38. A computer-readable storage medium containing instructions for allocating and controlling a computer system to provide data transfer services for a terminal, comprising instructions that cause the terminal to perform the steps of:
  (a) receiving an instruction that indicates to position a display object from a first display area to a second display area, wherein a first display area and a second display area are displayed on the display component and wherein a software object is associated with the display object, wherein the display object is indicative of the physical distance of the software object from the terminal;
  (b) processing the software object in response to step (a); wherein step (b) comprises the steps of:
    (i) if the software object is requested by the terminal, receiving the software object by the terminal from another terminal;
    (ii) if the software object is requested by the terminal, transmitting the software object by the terminal th the other terminal; and
  (c) updating the display object on a display component.

39. A wireless terminal for providing data transfer services, the wireless terminal comprising:
  a user interface module comprising a display component and an input component;
  a communications port;
  a memory;
  a processor that receives and transmits a software object through the communications port, receives one of a plurality of instructions from a user through the input component, and displays a display object corresponding to the software object on the display component, wherein the display object is indicative of the physical distance of the software object from the terminal, the processor configured to perform the steps of:

(a) upon receiving a first instruction that indicates to position the display object from another user's data area to a user's data area, copying the software object from another user's data storage capacity to the memory;
(b) copying the display object that is displayed on the other user's data area to a second display object that is displayed on the user's data area;
(c) upon receiving a second instruction that indicates to position the display object from the user's data area to the other user's data area, publishing the software object;
(d) upon receiving a third instruction that indicates to position the display object from the user's data area to an application area, opening the software object from the memory;
(e) showing display information on the application area, wherein the display information is generated by the processor processing the software object;
(f) upon receiving a fourth instruction that indicates to position the display object from the application area to the user's data area, storing the software object in the memory;
(g) displaying the display object on the user's data area, in response to step (f);
(h) upon receiving a fifth instruction that indicates to position the display object from the other user's data area to the application area, opening the software object from the other user's data storage capacity;
(i) showing the display information on the application area, wherein the display information is generated by the processor processing the software object; and
(j) upon receiving a sixth instruction that indicates to position the display object from the application area to the other user's data area, publishing the software object.

40. A wireless terminal for providing data transfer services, the terminal comprising:
a user interface module comprising a display component and an input component,
a communications port;
a memory;
a processor that receives and transmits a software object through the communications port, receives an instruction from a user through the input component, and displays a display object corresponding to the software object on the display component, wherein the display object is indicative of the physical distance of the software object from the terminal the processor configured to perform the steps of:
(a) receiving the instruction that indicates to position the display object from a first display area to a second display area, wherein the first display area and the second display area are displayed on the display component;
(b) processing the software object in response to step (a); and
(c) updating the display object on the display component; and
(d) in response to a change of a geographical location of the wireless terminal, dynamically altering a appearance of the display component, the appearance being indicative of a collection of software objects that are accessible to the wireless terminal from other terminals at a current geographical location.

41. A terminal for providing data transfer services, the terminal comprising:
a user interface module comprising a display component and an input component;
a communications port;
a memory;
a processor that receives and transmits a software object through the communications port, receives an instruction from a user through the input component, and displays a display object corresponding to the software object on the display component, wherein the display object is indicative of the physical distance of the software object from the terminal, the processor configured to perform the steps of:
(a) receiving the instruction that indicates to position the display object from a first display area to a second display area, wherein the first display area and the second display area are displayed on the display component, and wherein one of the display areas is associated with shareable software objects and a second of the display areas is associated with unshareable software objects; and
(b) processing the software object in response to step (a); and
(c) updating the display object on the display component.

42. A user interface of a wireless terminal that provides data transfer services, the wireless terminal being associated with an associated user, comprising:
a first display area that displays a first display object, wherein the first display object corresponds to a first software object that is classified as private data and that is associated only with the associated user;
a second display area that displays a second display object, wherein the second display object corresponds to a second software object that is classified as published data and that is publicly available to the associated user and to other users and wherein the second display object is indicative of the physical distance of the software object from the terminal; and
a transfer display component that enables the associated user to drag the first display object to the second display area, wherein the first software object is copied into a public portion of a memory, and that enables the associated user to drag the second display object to the first display area, wherein the second software object is copied into a private portion of the memory for execution, display, or storage by the associated user.

43. The user interface of claim 42, wherein the public portion of the memory comprises a first folder.

44. The user interface of claim 42, wherein the private portion of the memory comprises a second folder.

45. The user interface of claim 42, wherein the first display object comprises a first display icon and the second display object comprises a second display icon.

46. The user interface of claim 42, wherein the second display object is indicative of a location-based criterion that is associated with the second software object.

* * * * *

UNITED STATES PATENT AND TRADEMARK OFFICE
CERTIFICATE OF CORRECTION

PATENT NO.       : 7,159,186 B2
APPLICATION NO.  : 10/159410
DATED            : January 2, 2007
INVENTOR(S)      : Jouka Mattila et al.

It is certified that error appears in the above-identified patent and that said Letters Patent is hereby corrected as shown below:

In Claim 11, Column 8, Line 8:
    Please delete "claim 10" and insert --claim 9--

In Claim 25, Column 9, Line 29:
    Please delete "the terminal" and insert --the other terminal--

In Claim 38, Column 10, Line 51:
    Please delete "the terminal th" and insert --the terminal to--

In Claim 40, Column 11, Line 61-62:
    Please delete "altering a appearance" and insert --altering an appearance--

Signed and Sealed this

Twelfth Day of June, 2007

JON W. DUDAS
*Director of the United States Patent and Trademark Office*